United States Patent [19]

Shergill

[11] Patent Number: 5,418,659
[45] Date of Patent: May 23, 1995

[54] RELIABLE TIME-DOMAIN DEMARCATION OF SPLIT FORMATS IN EMBEDDED-SERVO, ZONED-DATA RECORDING DISK DRIVES

[75] Inventor: Ravinder S. Shergill, Danville, Calif.

[73] Assignee: National Semiconductor Corporation, Santa Clara, Calif.

[21] Appl. No.: 173,794

[22] Filed: Dec. 23, 1993

[51] Int. Cl.⁶ .............................................. G11B 5/09
[52] U.S. Cl. ..................................................... 360/51
[58] Field of Search ................... 360/51, 53, 49, 32, 360/78.05, 77.08, 77.05, 77.04, 78.14; 369/59

[56] References Cited

U.S. PATENT DOCUMENTS

| | | | |
|---|---|---|---|
| 4,214,280 | 7/1980 | Halyhill et al. | 360/53 |
| 5,162,954 | 11/1992 | Miller et al. | 360/49 X |
| 5,257,143 | 10/1993 | Zangenehpour | 360/51 X |
| 5,274,509 | 12/1993 | Buch | 360/51 X |
| 5,276,564 | 1/1994 | Herring et al. | 360/51 |
| 5,285,327 | 2/1994 | Hetzler | 360/51 X |

OTHER PUBLICATIONS

National Semiconductor SFFDC Small Form Factor Disk Controller Specification, Oct. 25, 1992. The Examiner's attention is specifically drawn to pp. 14, 21-22, and 40.

Non-Disclosure Agreement between National Semiconductor and Aura Associates dated Aug. 2, 1991.
Data Sheet for Cirrus Logic CL-SH360 dated Apr. 1992.

Primary Examiner—Donald Hajec
Assistant Examiner—Le Thien Minh
Attorney, Agent, or Firm—Limbach & Limbach; H. Donald Nelson; Vincenzo D. Pitruzzella

[57] ABSTRACT

A demarcation circuit of the read channel of a disk drive identifies when the last byte of data prior to a servo block has been read, regardless of where the servo block is positioned, by generating an interrupt signal in response to the leading edge of a multi-byte marking signal when a time out signal is present. The time out signal is generated after a predetermined number of clock signals have been counted following the beginning of a servo block. The multi-byte marking signal is generated after a predetermined number of bytes have been counted. By insuring that the total number of bytes between servo blocks is a multiple of the predetermined number of bytes, the multi-byte signal will, at one point in time, identify the last byte of data. The time out signal can be used to identify the last multi-byte marking signal by properly selecting the predetermined number of clock signals and by insuring that the time required to read the predetermined number of bytes is greater than a timing error which results from variations in the spindle speed.

20 Claims, 12 Drawing Sheets

RELIABLE TIME-DOMAIN DEMARCATION OF SPLIT FORMATS IN EMBEDDED-SERVO, ZONED-DATA RECORDING DISK DRIVES

BACKGROUND OF THE INVENTION

1. Field of the Invention

The present invention relates to disk drives and, in particular, to a demarcation circuit that identifies when the last byte of data prior to a servo block has been read, regardless of the location of the servo block.

2. Description of the Related Art

Magnetic recording disks store data in a series of concentric recording tracks which are each logically divided into a number of sectors. Each recording track is also divided by a number of servo blocks which are used by the servo head of a disk drive to control the positioning of the read/write head over the tracks.

An embedded-servo recording format is a well known disk format that positions the servo blocks so that the servo blocks within each track radially correspond with the servo blocks of the adjoining tracks. As a result, the servo blocks form a number of pie-shaped regions that extend radially outward from the center of the disk. With the embedded-servo format, the sectors are typically positioned to follow immediately after a servo block, thereby allowing the read/write head of the disk drive uninterrupted access to the sector.

A zoned-data recording format is another well known disk format that groups a number of adjoining tracks together to form zones. By forming zones, a large number of equally-sized sectors can be formed on a disk. The zoned-data recording format takes advantage of the fact that the circumference of the tracks, and thereby the recording area, increases as the tracks move radially outward. Thus, for example, an inner zone may have 50 n-bit sectors per track while an intermediate zone may have 75 n-bit sectors per track and an outer zone 100 n-bit sectors per track.

One problem with using zoned-data recording on disks that also employ embedded servo blocks is that the servo blocks typically end up "splitting" the sectors in an irregular fashion in all but the most inner zones. FIG. I shows a timing diagram that illustrates the relationship between sectors and servo blocks when an embedded-servo, zoned-data recording format is utilized.

As shown in FIG. 1, a first servo block 10 occurs approximately in the middle of a sector n while a second servo block 12 occurs just after the beginning of a sector n+1. Thus, when the read/write head of a disk drive is reading from a "split" sector, the data path control circuitry of the disk drive must be able to determine where the data ends and the servo block begins to avoid reading in unwanted data.

The most common solution to this problem is to determine the number of bytes that are recorded between the beginning of each sector and the beginning of the servo block that splits the sector, and between the end of the servo block and the end of the sector, and then store these values as a byte number in the ID field of the sector. In operation, a demarcation circuit reads in the byte number and then counts the bytes of data as they are being read from the disk. Thus, when the count matches the byte number, the last byte of data prior to the servo block has been read and the demarcation circuit can suspend operation of the read/write circuitry.

The principle disadvantage of this solution is the lost recording area that results when the position of a servo block causes the ID field to be "split". If an ID field were allowed to be split, the demarcation circuit could not read the byte number, and therefore could not determine the number of bytes to count.

Thus, as shown in FIG. 1, when a servo block splits an ID field, the beginning of the sector is typically adjusted so that the sector begins after the end of the servo block. As a result, the recording area between the original beginning position of the sector and the adjusted beginning position is typically lost. In addition, recording area is also lost as a result of the extra overhead that is required to store the byte number.

Another solution to this problem is to utilize a demarcation circuit that counts the number of reference clock signals that occur between successive servo blocks. Since the number of reference clock signals which can occur between the servo blocks of a specific track at a specific clock frequency is constant, there is no need to store a count number in the ID field. Further, since the ID field is no longer being utilized to store a count number, a servo block which splits the ID field no longer presents a problem.

Thus, with this approach, a demarcation circuit reads an internally-stored clock count number and then counts the reference clock signals as they are detected. When the count matches the clock count number, the last byte of data prior to the servo block has been read and the demarcation circuit can suspend operation of the read/write circuitry.

The principal disadvantage of this approach is that the reference clock signal, which is an externally-generated, crystal-controlled clock signal, does not accurately represent the timing of the data as it is being read from the disk. This lack of accuracy results from slight variations which occur in the spindle speed of the typical disk data recovery device.

As is well known, data is written to a disk by writing one bit of data for each n reference clock periods, i.e., one bit of data per each clock period. When data is then written to a disk at a constant spindle speed, each bit of data consumes a specific amount of disk space. As the spindle speed varies, however, more or less disk space is consumed. As a result, more or less time is required to read back each bit of data.

Thus, although the time required to count x reference clock signals will remain constant, a timing error will result because the number of bits of data which will have been read during that time will vary as a function of the variation of the spindle speed. As a result, the reference clock signal cannot be utilized to accurately identify when the last byte of data prior to a servo block has been read. Thus, there is a need for a demarcation circuit that can accurately read the data in a sector regardless of which field is split by a servo block.

SUMMARY OF THE INVENTION

The present invention provides a demarcation circuit that indicates when the last byte of data of a plurality of bytes of data recorded between servo blocks has been read. As a result, the demarcation circuit can indicate when the last byte of data in each portion of a sector split by a servo block has been read, regardless of where the servo block splits the sector. Thus, the present invention allows data to be read from and written to portions of a disk that were previously unusable, thereby increasing the storage capacity of the disk.

In accordance with the present invention, the demarcation circuit includes a frame counter that counts a plurality of externally-generated clock signals after the beginning of a servo block, and that generates a time out signal after a first predetermined number of clock signals has been counted. The demarcation circuit further includes a byte counter and a multi-byte counter. The byte counter generates a byte signal each time a second predetermined number of clock signals has been counted. Similarly, the multi-byte counter generates a multi-byte signal each time a predetermined number of byte signals has been counted. In the present invention, the plurality of bytes of data recorded between servo blocks is a multiple of the predetermined number of byte signals. Finally, the demarcation circuit also includes a controller that generates an interrupt signal when the multi-byte signal is asserted after the time out signal has occurred. The interrupt signal can be utilized, for example, by a disk data recovery device to stop a data read operation.

In operation, by generating the multi-byte signal each time a predetermined number of bytes are detected, and by insuring that the total number of bytes is a multiple of the predetermined number of bytes, then, at one point in time, the multi-byte signal will indicate that the last byte of data has been read. The multi-byte signal that represents the last byte of data is then identified by using the time out signal.

As stated above, the time out signal is generated after a first predetermined number of clock signals have been counted. Ideally, the first predetermined number of clock signals can be selected so that the time out signal and the multi-byte signal that represents the last byte of data occur at the same time.

Variations in the spindle speed of a typical disk drive device, however, produce a timing error between the time out signal and the multi-byte signal that represents the last byte of data. This timing error is corrected by properly selecting the first predetermined number of clock signals, and by selecting the predetermined number of bytes so that the time required to read the predetermined number of bytes is greater than the timing error.

By properly selecting the first predetermined number of clock signals, the worst case timing error can be adjusted so that the time out signal occurs just prior to the multi-byte signal that represents the last byte of data. By properly selecting the predetermined number of bytes so that the time required to read the predetermined number of bytes is greater than the total timing error, the next to the last multi-byte signal will occur before the time out signal. As a result, the only time that the multi-byte signal occurs after the time out signal has been asserted is after the last byte of data has been read.

The frame counter can count the plurality of clock signals by, for example, loading the first predetermined number of clock signals into a clock count register in response to a load signal, and by decrementing the first predetermined number of clock signals each time a clock signal is detected.

The multi-byte counter can count the byte signals, for example, by setting the predetermined number of byte signals in response to a select signal, by resetting a multi-byte count number in response to either the load signal or a reset signal, by incrementing the multi-byte count number in response to each byte signal, by generating the multi-byte signal each time the multi-byte count number equals the predetermined number of byte signals, and by resetting the multi-byte count number each time the multi-byte signal is generated.

In a first alternative embodiment, the demarcation circuit can also include a synchronizer that generates the load signal when the clock signal is asserted after a servo signal has occurred where the servo signal represents the leading edge of a servo block. The synchronizer eliminates any metastability in the servo signal and insures that the first predetermined number of clock signals is initially decremented one clock period after the first predetermined number of clock signals has been loaded.

In a second alternative embodiment, the demarcation circuit can further include a count logic circuit that generates a decrement signal each time either the clock signal or an externally-generated switch signal is received where the frame counter counts in response to the decrement signal. In the second alternative embodiment, the switch signal represents each change in the source of the clock signal.

Disk drive devices typically generate a recovered clock signal from data read from the disk, and substitute a reference clock signal when data is not being read from the disk. These disk drive devices also typically drop a clock signal each time the disk drive device switches between recovered clock signals and reference clock signals. Thus, by configuring the frame counter to also respond to changes in the source of the clock signal, the accuracy of the count is improved.

In a third alternative embodiment, the demarcation circuit can additionally include learning circuitry that determines the first predetermined number of clock signals by reconfiguring the frame counter to count and store the number of clock signals which occur between servo blocks.

In the third alternative embodiment, the demarcation circuit includes a synchronizer that generates a synch signal each time that a clock signal is asserted after an externally-generated servo signal has occurred. A count logic circuit receives an externally-generated switch signal and the clock signal, and generates a decrement signal each time the clock signal is received and each time the switch signal is received. A learning circuit generates a load signal in response to each synch signal when both a learning signal and a store signal are set to a first logic state, and generates the learning signal with a second logic state in response to the first synch signal that occurs after the logic state of an externally-generated control signal is set to a first logic state. The learning circuit also changes the logic state of the learning signal to the first logic state, and generates the store signal with a second logic state in response to the second synch signal that occurs after the logic state of the control signal is set to a the first logic state. The learning circuit then returns the store signal to the first logic state in response to the third synch signal to occur. The demarcation circuit further includes a frame counter that loads a clock count number in response to the load signal, that decrements the clock count number in response to each decrement signal, and that generates a time out signal after a predetermined number of decrement signals have been counted. The frame counter also resets the clock count number when the logic state of the learning signal is set to the second logic state, increments the clock count number in response to each decrement signal when the logic state of the learning signal is set to the second logic state, and stores the incremented clock count number when the logic state of the store signal is set to the second logic state. As with the original embodiment, the third embodiment also includes a byte counter, a multi-byte counter, and a controller that function as described above.

A better understanding of the features and advantages of the present invention will be obtained by reference to the following detailed description and the accompanying drawings which set forth an illustrative embodiment in which the principles in the invention are utilized.

DETAILED DESCRIPTION

Figure 2:
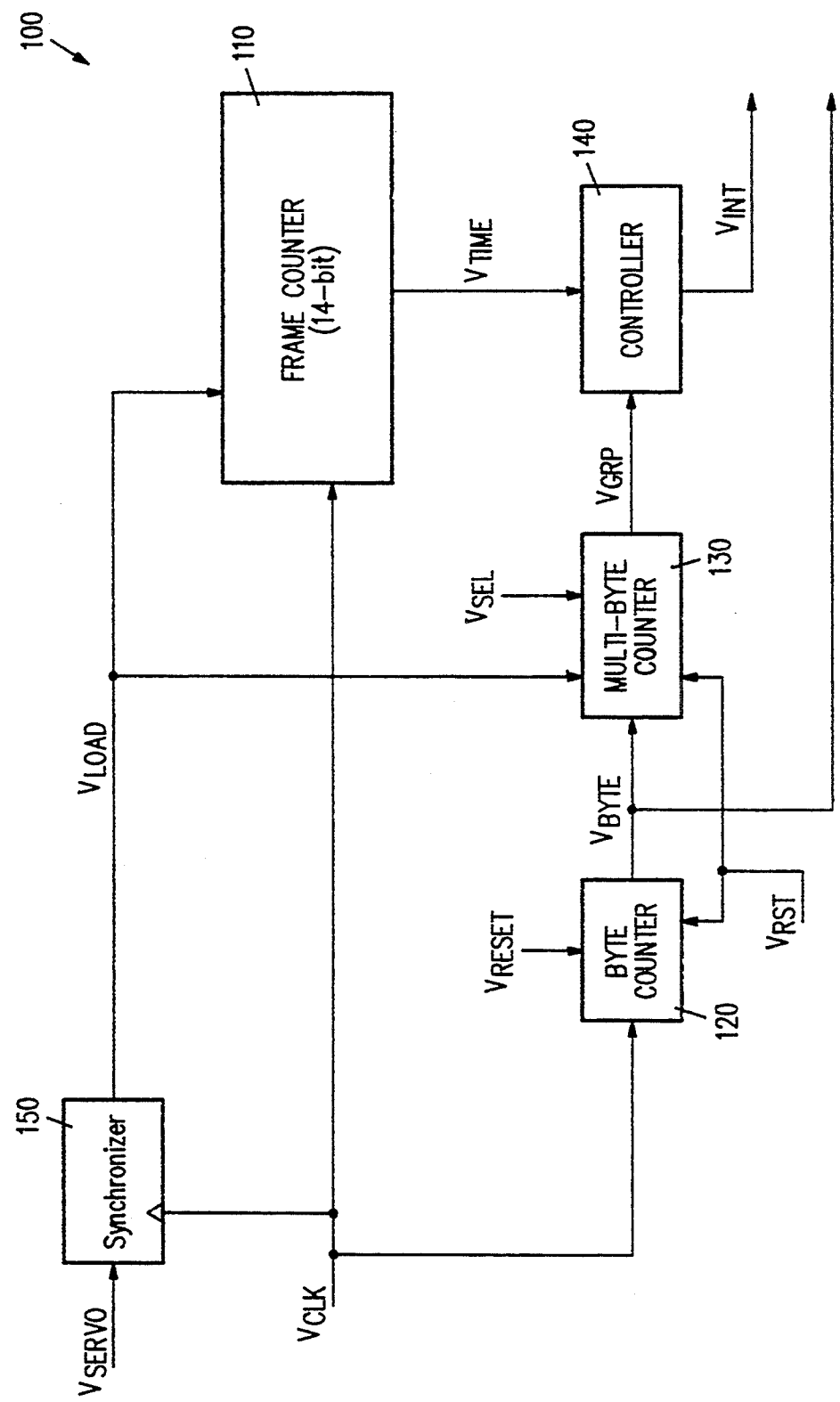
FIG. 2 is a block diagram illustrating a demarcation circuit 100 in accordance with the present invention.

FIG. 2 shows a block diagram that illustrates a demarcation circuit 100 in accordance with the present invention. As stated above, demarcation circuit 100 indicates when the last byte of data recorded in each portion of a sector split by a servo block has been read, regardless of where the servo block splits the sector, thereby allowing a disk data recovery device to stop data read operations prior to the servo block.

Demarcation circuit 100 indicates when the last byte of data has been read by utilizing clock counting circuitry to indicate when a predetermined number of externally-generated clock signals have been detected after the beginning of each servo block, byte counting circuitry to indicate each time eight clock signals have been detected, multi-byte marking circuitry to indicate each time a predetermined number of bytes have been detected by the byte counting circuitry, and control circuitry to indicate when the predetermined number of bytes are detected after the predetermined number of clock signals have been detected.

Figure 3:
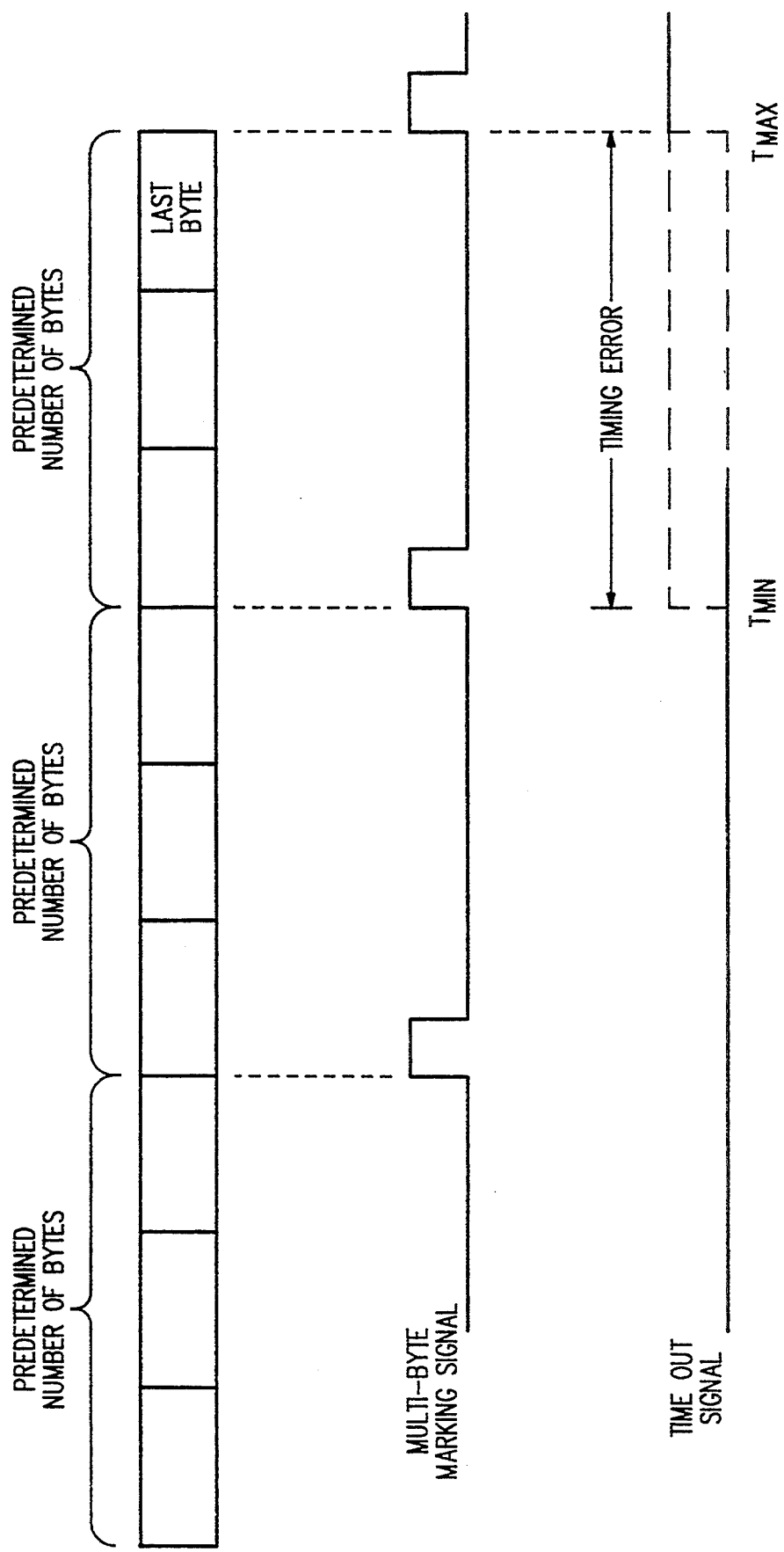
FIG. 3 is a timing diagram illustrating the operation of the present invention.

FIG. 3 shows a timing diagram which illustrates the operation of the present invention. As shown in FIG. 3, by generating a multi-byte marking signal each time a predetermined number of bytes are detected, and by insuring that the total number of bytes is a multiple of the predetermined number of bytes, then, at one point in time, the multi-byte marking signal will indicate that the last byte of data has been read. The multi-byte marking signal that represents the last byte of data can then be identified by generating a time out signal after the predetermined number of clock signals have been detected.

Ideally, the predetermined number of clock signals can be selected so that the time out signal and the multi-byte marking signal that represents the last byte of data occur at the same time. However, as described above, variations in the spindle speed of a typical disk drive device will cause a timing error between the time out signal and the multi-byte marking signal that represents the last byte of data. As shown in FIG. 3, for a set number of clock signals, the spindle speed variation will cause the time out signal to be generated within a range of times from a minimum time $T_{MIN}$ to a maximum time $T_{MAX}$.

In the present invention, the timing error is corrected by properly selecting the predetermined number of clock signals, and by selecting the predetermined number of bytes so that the time required to read the predetermined number of bytes is greater than the total timing error.

As further shown in FIG. 3, by properly selecting the predetermined number of clock signals, the maximum time $T_{MAX}$ can be adjusted to occur just before the leading edge of the last multi-byte marking signal. By then selecting the predetermined number of bytes so that the time required to read the predetermined number of bytes is greater than the timing error, the minimum time $T_{MIN}$ will occur after the leading edge of the next to last multi-byte marking signal. As a result, the only time that the multi-byte marking signal occurs after the time out signal has been asserted is after the last byte of data has been read. Thus, the data read operation can then be stopped by configuring the control circuitry to generate an interrupt signal in response to the leading edge of the multi-byte marking signal when the time out signal has occurred.

Referring to FIG. 2, demarcation circuit 100 includes a frame counter 110 that counts a plurality of externally-generated clock signals $V_{CLK}$ after the beginning of each servo block, and that generates a time out signal $V_{TIME}$ after a predetermined number of clock signals $V_{CLK}$ have been counted.

In the preferred embodiment, frame counter 110 counts the predetermined number of clock signals $V_{CLK}$ by loading a clock count number stored in an internal clock count register into an internal count register in response to a load signal $V_{LOAD}$ which, as described in greater detail below, is generated at the beginning of each servo block, and by then decrementing the clock count number once in response to each clock signal $V_{CLK}$. After the clock count number has been decremented to zero, the time out signal $V_{TIME}$ is generated. In the preferred embodiment of the present invention, the clock signals $V_{CLK}$ represent recovered clock signals when available, and reference clock signals at all other times.

Figure 1:
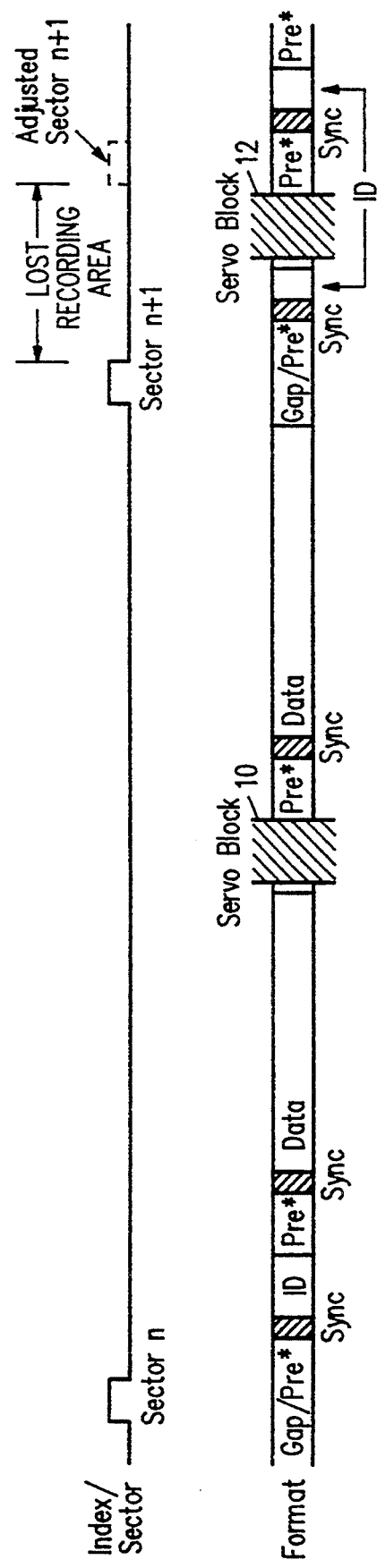
FIG. 1 is a timing diagram illustrating the relationship between sectors and servo blocks when an embedded-servo, zoned-data recording format is utilized.

Circuit 100 also includes a byte counter 120 that generates a byte signal $V_{BYTE}$ each time eight clock signals $V_{CLK}$ are detected. The byte signal $V_{BYTE}$ is generated by resetting a bit count number in response to the externally-generated reset signals $V_{RST}$ or $V_{RESET}$, incrementing the bit count number in response to each clock signal $V_{CLK}$, generating the byte signal $V_{BYTE}$ each time eight clock signals $V_{CLK}$ are detected, and resetting the bit count number each time the byte signal $V_{BYTE}$ is generated. The reset signal $V_{RESET}$ can be, for example, a simple chip reset signal. Referring again to FIG. 1, in the preferred embodiment, the reset signal $V_{RST}$ is generated in response to each sync marker.

Referring back to FIG. 2, a multi-byte counter 130 generates a multi-byte signal $V_{GRP}$ each time a predetermined number of byte signals $V_{BYTE}$ are detected. The multi-byte signal $V_{GRP}$ is generated by resetting a multi-byte count number in response to either the reset signal $V_{RST}$ or the load signal $V_{LOAD}$, incrementing the multi-byte count number in response to each byte signal $V_{BYTE}$, generating the multi-byte signal $V_{GRP}$ each time the multi-byte count number equals the predetermined number of bytes, and resetting the multi-byte count number each time the multi-byte signal $V_{GRP}$ is generated.

Although the predetermined number of bytes can be set to any value, in the preferred embodiment, a select signal $V_{SEL}$ is used to set the predetermined number to either one, two, three, or four. Thus, for example, when the predetermined number is set at three, the multi-byte signal $V_{GRP}$ will be generated each time three byte signals $V_{BYTE}$ are detected.

Circuit 100 further includes a controller 140 that generates an interrupt signal $V_{INT}$ upon the next assertion of the multi-byte signal $V_{GRP}$ after the assertion of the timeout signal $V_{TIME}$ has been detected. The interrupt signal $V_{INT}$ indicates that the last byte of data has been read, and that the data read operations of the disk data recovery device can be stopped.

In operation, each time a servo block is detected, frame counter 110 loads a clock count number from the clock register and, with the next clock signal $V_{CLK}$, begins decrementing the clock count number. After the clock count number has been decremented to zero, the time out signal $V_{TIME}$ is generated. As stated above, by properly selecting the value of the clock count number, the time out signal $V_{TIME}$ can be generated just before the last byte of data is read.

At the same time, byte counter 120 is generating the byte signal $V_{BYTE}$ each time eight clock signals $V_{CLK}$ are detected, while multi-byte counter 130 is generating the multi-byte signal $V_{GRP}$ each time a predetermined number of byte signals $V_{BYTE}$ are detected. By insuring that the total number of bytes is a multiple of the predetermined number of byte signals $V_{BYTE}$, the only time that the multi-byte signal $V_{GRP}$ is asserted after the time out signal $V_{TIME}$ has occurred is when the last byte of data has been read.

In a first alternative embodiment, circuit 100 can also include a synchronizer 150 that generates the load signal $V_{LOAD}$ when the clock signal $V_{CLK}$ is asserted after an externally-generated servo signal $V_{SERVO}$ has occurred where the servo signal $V_{SERVO}$ represents the leading edge of a servo block. Synchronizer 150 eliminates any metastability in the load signal $V_{LOAD}$ and insures that the clock count number is first decremented one clock period after the clock count number has been loaded.

In addition to the timing errors which have been described above, a further timing error can be introduced by the switching circuitry which is typically utilized to generate the clock signal $V_{CLK}$. As stated above, in the preferred embodiment, the clock signal $V_{CLK}$ represents the recovered clock signal when available, and the reference clock signal at all other times.

Since it is unlikely that the phase of the recovered clock signal will match the phase of the reference clock signal when the signals are switched, conventional switching circuitry typically generates a long transitional pulse by combining the overlapping reference clock and recovered clock pulses. As a result, the first leading edge of the clock signal which is being switched in is typically lost. Thus, each time the source of the clock signal $V_{CLK}$ changes, the clock count number is under decremented by one.

Figure 4:
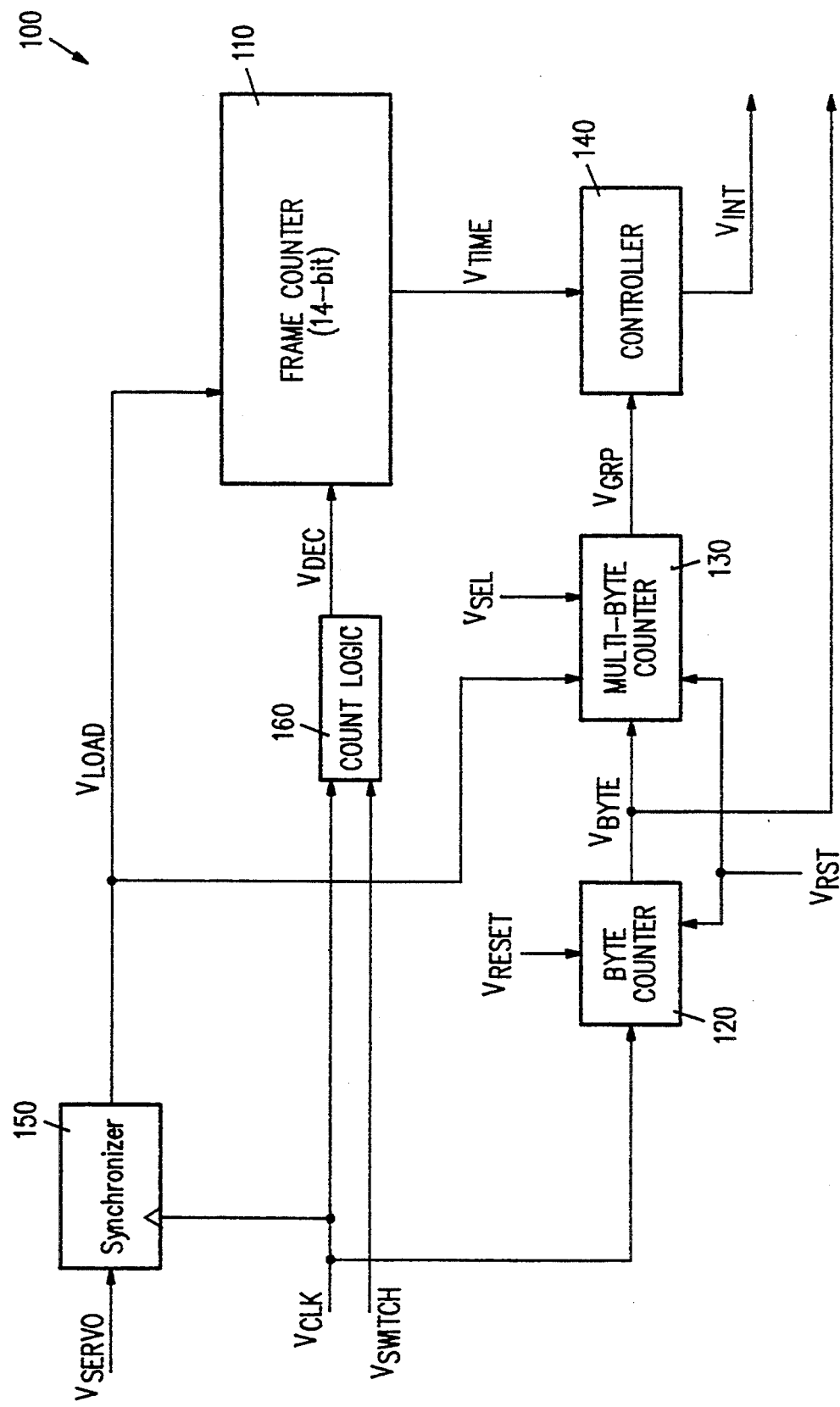
FIG. 4 is a block diagram illustrating a second alternative embodiment in accordance with the present invention.

FIG. 4 shows a block diagram that illustrates a second alternative embodiment in accordance with the present invention. As shown in FIG. 4, a count logic circuit 160 generates a decrement signal $V_{DEC}$ each time either the clock signal $V_{CLK}$ or an externally-generated switch signal $V_{SWITCH}$ is detected. In the present invention, the switch signal $V_{SWITCH}$ indicates each time the source of the clock signal $V_{CLK}$ has been switched.

In operation, frame counter 110 decrements the clock count number once each time the decrement signal $V_{DEC}$ is detected. As a result, the clock count number is decremented once each time the source of the clock signal $V_{CLK}$ is switched, even though the leading edge of the first clock pulse is lost.

In a third alternative embodiment, the demarcation circuit of the present invention can also include learning circuitry that determines the clock count number by reconfiguring the frame counter to count and store the number of clock signals $V_{CLK}$ which are detected between successive servo blocks.

Figure 5:
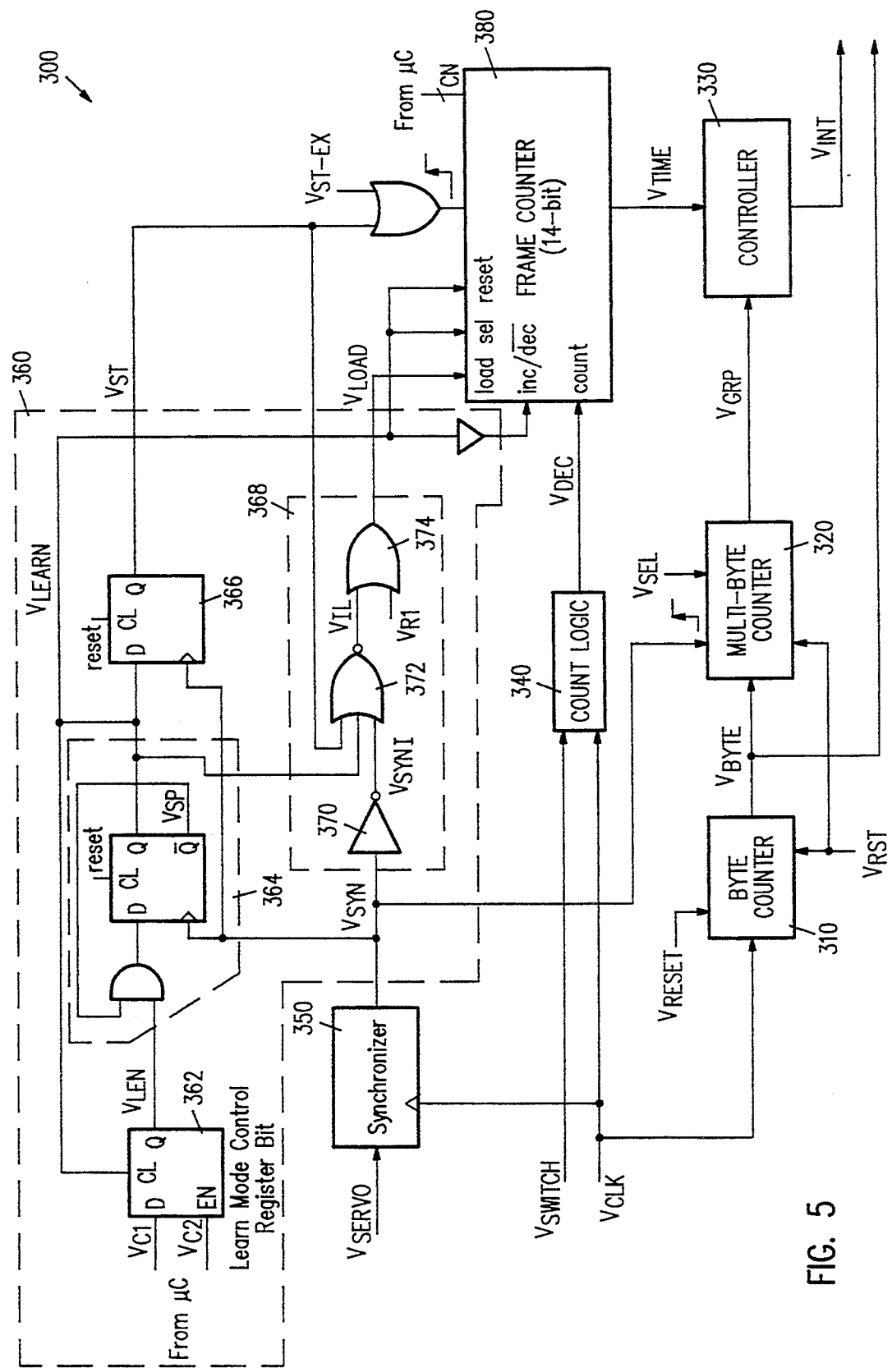
FIG. 5 is a block diagram illustrating a demarcation circuit 300 in accordance with a third alternative embodiment.

FIG. 5 shows a block diagram of a demarcation circuit 300 that illustrates the third alternative embodiment. As shown in FIG. 5, circuit 300 includes a byte counter 310, a multi-byte counter 320, a controller 330, and a count logic circuit 340, each of which function as described above. In addition, circuit 300 also includes a synchronizer 350 that generates a synch signal $V_{SYN}$ indicating the beginning of a servo block each time the externally-generated clock signal $V_{CLK}$ is asserted after the externally-generated servo signal $V_{SERVO}$ has occurred.

Circuit 300 further includes a learning circuit 360 that generates the load signal $V_{LOAD}$ in response to each synch signal $V_{SYN}$ when both a learning signal $V_{LEARN}$ and a store signal $V_{ST}$ are set to a low logic state, and that generates the learning signal $V_{LEARN}$ with a high logic state in response to the first synch signal $V_{SYN}$ that occurs after the logic states of a pair of externally-generated control signals $V_{C1}$ and $V_{C2}$ are set to a high logic state. In addition, learning circuit 360 also changes the logic state of the learning signal $V_{LEARN}$ to the low logic state, and generates the store signal $V_{ST}$ with a second logic state in response to the second synch signal $V_{SYN}$ that occurs after the control signals $V_{C1}$ and $V_{C2}$ are set to a logic high.

Learning circuit 360 includes a first D latch 362 that latches the logic state of the first control signal $V_{C1}$ as a learning enable signal $V_{LEN}$ when the second control signal $V_{C2}$ is asserted, and that resets the learning enable signal $V_{LEN}$ when the logic state of the learning signal $V_{LEARN}$ is high. Thus, when the pair of control signals $V_{C1}$ and $V_{C2}$ are a logic high, the learning enable signal is latched high.

Learning circuit 360 also includes a logic and latch circuit 364 that latches the logic state of the learning enable signal $V_{LEN}$ as the learning signal $V_{LEARN}$, and that latches the inverse of the logic state of the learning enable signal $V_{LEN}$ as a stop signal $V_{SP}$ in response to the synch signal $V_{SYN}$. Logic and latch circuit 364 includes an AND gate and a second D latch.

Thus, when the learning enable signal $V_{LEN}$ is a logic high and a first synch signal $V_{SYN}$ is received, the learning signal $V_{LEARN}$ is latched high while the stop signal $V_{SP}$ is latched low. The stop signal $V_{SP}$ then drives the logic state of the output of the AND gate low which, in turn, drives the logic state of the learning signal $V_{LEARN}$ low when a second synch signal $V_{SYN}$ is received.

A third D latch 366 latches the logic state of the learning signal $V_{LEARN}$ as a store signal $V_{ST}$ in response to the synch signal $V_{SYN}$. Thus, at the same time that the second synch signal $V_{SYNCH}$ changes the logic state of the learning signal $V_{LEARN}$ from a high to a low, the second synch signal $V_{SYNCH}$ also changes the start signal $V_{ST}$ from a logic low to a logic high. Since the second synch signal $V_{SYN}$ changes the learning signal $V_{LEARN}$ to a logic low, a third synch signal $V_{SYN}$ returns the start signal $V_{ST}$ to a logic low.

A logic circuit 368 serves to inhibit the load signal $V_{LOAD}$ as long as the logic state of either the learning signal $V_{LEARN}$ or the start signal $V_{ST}$ is high, i.e., during the duration of a learning operation.

As shown in FIG. 5, logic circuit 368 includes an invertor gate 370 which inverts the synch signal $V_{SYN}$ to produce an inverted synch signal $V_{SYNI}$, a NOR gate 372 which inputs the inverted synch signal $V_{SYNI}$, the learning signal $V_{LEARN}$, and the start signal $V_{ST}$ to produce an intermediate load signal $V_{IL}$, and an OR gate 374 that inputs the intermediate load signal $V_{IL}$ and an externally-generated reset signal $V_{R1}$.

During normal operation, the logic states of both the learning signal and the start signal are low. Thus, each occurrence of the synch signal $V_{SYN}$ causes the load signal $V_{LOAD}$ to be asserted. In addition, the load signal $V_{LOAD}$ can also be asserted by the reset signal $V_{R1}$.

During a learning operation, however, when the logic state of either the learning signal $V_{LEARN}$ or the start signal $V_{ST}$ are high, NOR gate 372 is forced to generate the intermediate load signal $V_{IL}$ as a logic low. As a result, the logic state of the load signal $V_{LOAD}$ is held low in response to both the second and third occurrences of the synch signal $V_{SYN}$.

Circuit 300 also includes a frame counter 380 that loads the clock count number into the internal count register in response to the load signal $V_{LOAD}$, that decrements the clock count number in response to each decrement signal $V_{DEC}$, and that generates a time out signal $V_{TIME}$ after a predetermined number of decrement signals $V_{DEC}$ have been counted.

In addition, frame counter 380 also resets the clock count number when the learning signal $V_{LEARN}$ is in a high logic state, increments the clock count number in response to each decrement signal $V_{DEC}$ when the logic state of the learning signal $V_{LEARN}$ is high, and stores the incremented count as the clock count number when the logic state of the store signal $V_{ST}$ is high.

In operation, when the logic states of the learning signal $V_{LEARN}$ and the store signal $V_{ST}$ are low, frame counter 370, as above, counts the predetermined number of decrement signals $V_{DEC}$ by loading the clock count number into the count register in response to the load signal $V_{LOAD}$, and by then decrementing the clock count number once in response to each decrement signal $V_{DEC}$. After the clock count number has been decremented to zero, the time out signal $V_{TIME}$ is generated.

When the logic state of the learning signal $V_{LEARN}$ is high, frame counter 370 determines the clock count number by resetting the count register to zero when the logic state of the learning signal $V_{LEARN}$ transitions high, by incrementing the count register once each time the decrement signal $V_{DEC}$ is received, and by storing the count in the clock register when the logic state of the store signal $V_{ST}$ transitions high.

As shown in FIG. 5, the clock number can also be stored in the clock count register when the logic state of the learning signal $V_{LEARN}$ is low and the logic state of an externally-generated store signal $V_{ST-EX}$ transitions to a logic high. Under these conditions, a count number CN will be stored. Similarly, as stated above, when the logic state of the learning signal $V_{LEARN}$ is high and the logic state of the store signal $V_{ST}$ transitions to a logic high, the incremented count number is stored.

As stated above, since reference clock signals do not accurately represent the timing of the data due to slight variations in the spindle speed, the clock signals $V_{CLK}$ in the preferred embodiment represent recovered clock signals when available, and reference clock signals at all other times. The recovered clock signals, however, are only available when data is being read from the disk.

Although data is read from the ID field of each sector, the amount of data stored in the ID field is typically insignificant compared to the amount of data stored in the data field of each sector. With a typical disk drive device, however, the data stored in the data field of each sector is only read from the disk after the format control circuit of a disk controller identifies the sector which is to be read. Thus, with a typical disk drive device, the recovered clock signals, for all practical purposes, are only available after the sector to be read has been identified and the data field is read.

Figure 6:
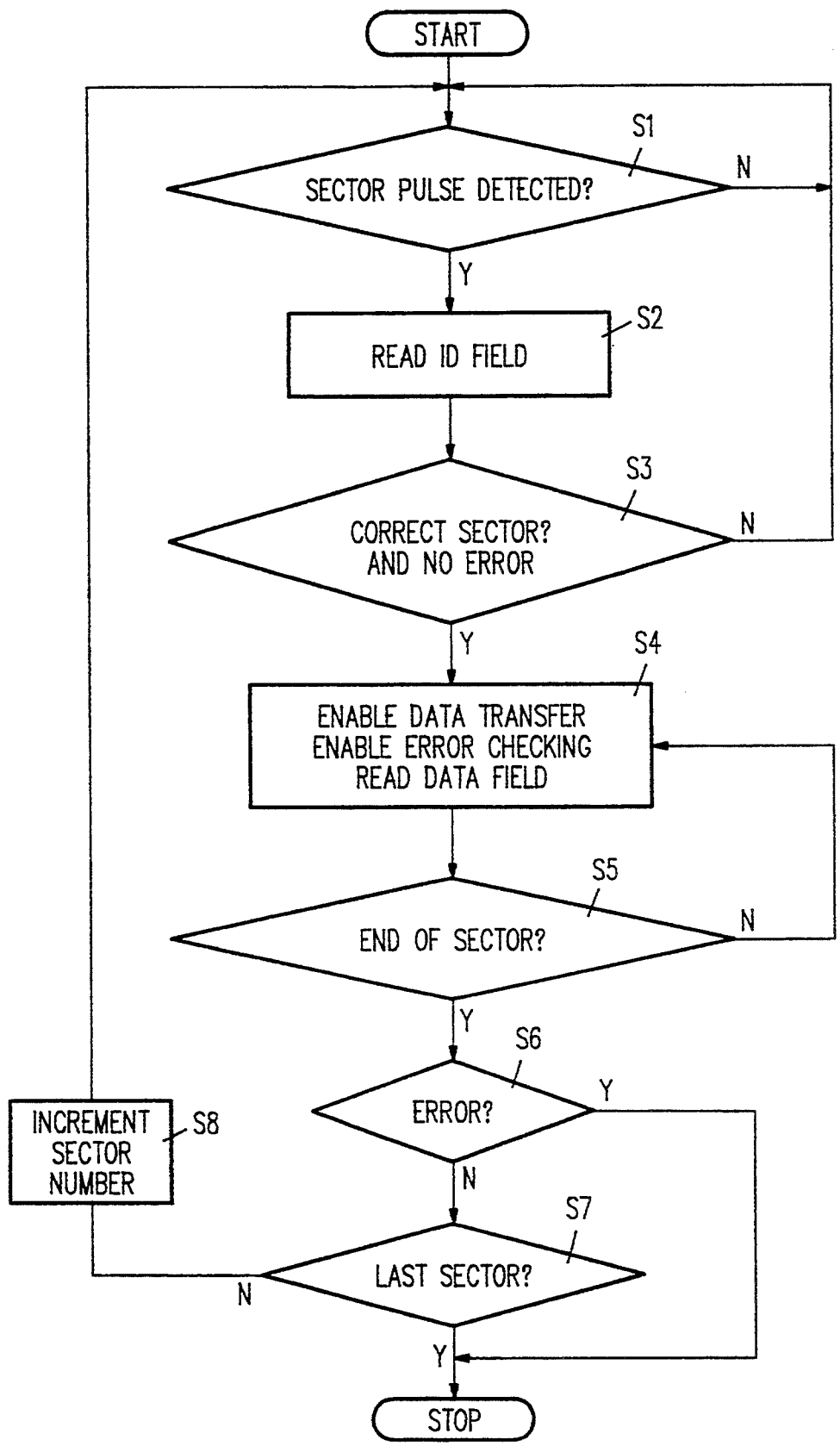
FIG. 6 is a flow diagram illustrating the operation of a conventionally programmed format control circuit.

For example, FIG. 6 shows a flow diagram that illustrates the operation of a conventionally programmed format control circuit. The format control circuit of a standard disk controller, such as National Semiconductor Model No. DPC-260, can be programmed to accommodate different sector formats.

As shown in FIG. 6, operation typically begins at step S1 by detecting a sector pulse. After a sector pulse has been detected, operation moves to step S2 where the format control circuit reads the ID field of the sector. At step S3, the format control circuit determines whether that sector is the sector to be read and whether the ID field contains an error. If that sector is not the sector to be read, or if the ID field contains an error, operation returns to step S1 to wait for the next sector pulse to be detected.

If the detected sector is the sector which is to be read, the format control circuit enables the data transfer circuitry, the error checking circuitry, and reads the data stored in the data field in step S4. After the end of the sector has been detected in step S5, the format control circuit determines whether an error has occurred in step S6.

If the data is error free, operation moves to step S7 where the format control circuit determines whether the sector which has just been read is the last sector to be read. If not, the format control circuit increments the current sector number in step S8 and returns to step S1 to wait for the next sector pulse.

Figure 7:
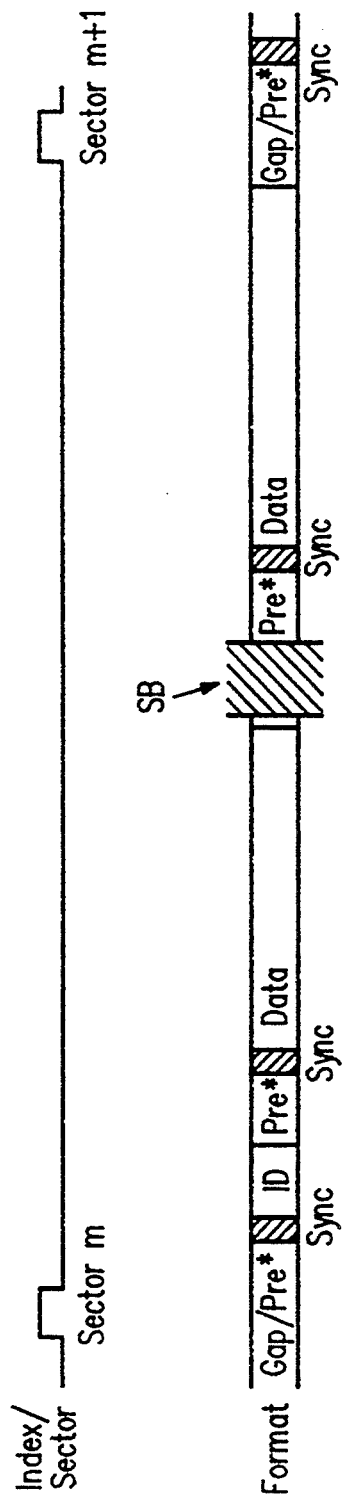
FIG. 7 is a timing diagram illustrating an example of an embedded-servo, zoned-data recording format.

FIG. 7 shows a timing diagram that illustrates an example of an embedded-servo, zoned-data recording format. As shown in FIG. 7, servo block SB is positioned midway between sector m and sector m+1. As described above, the demarcation circuit of the present invention will begin counting the clock signals $V_{CLK}$ when the servo block SB is detected.

Thus, if sector m+1 is the sector which is to be read, the clock signals $V_{CLK}$ generated between the beginning of the servo block SB and the beginning of sector m+1 will represent reference clock signals. As a result, there is a need for a format control circuit that allows the data stored in the data field of each sector to be read, thereby generating the recovered clock signals, regardless of whether the sector being read is the sector which is to be read.

Figure 8:
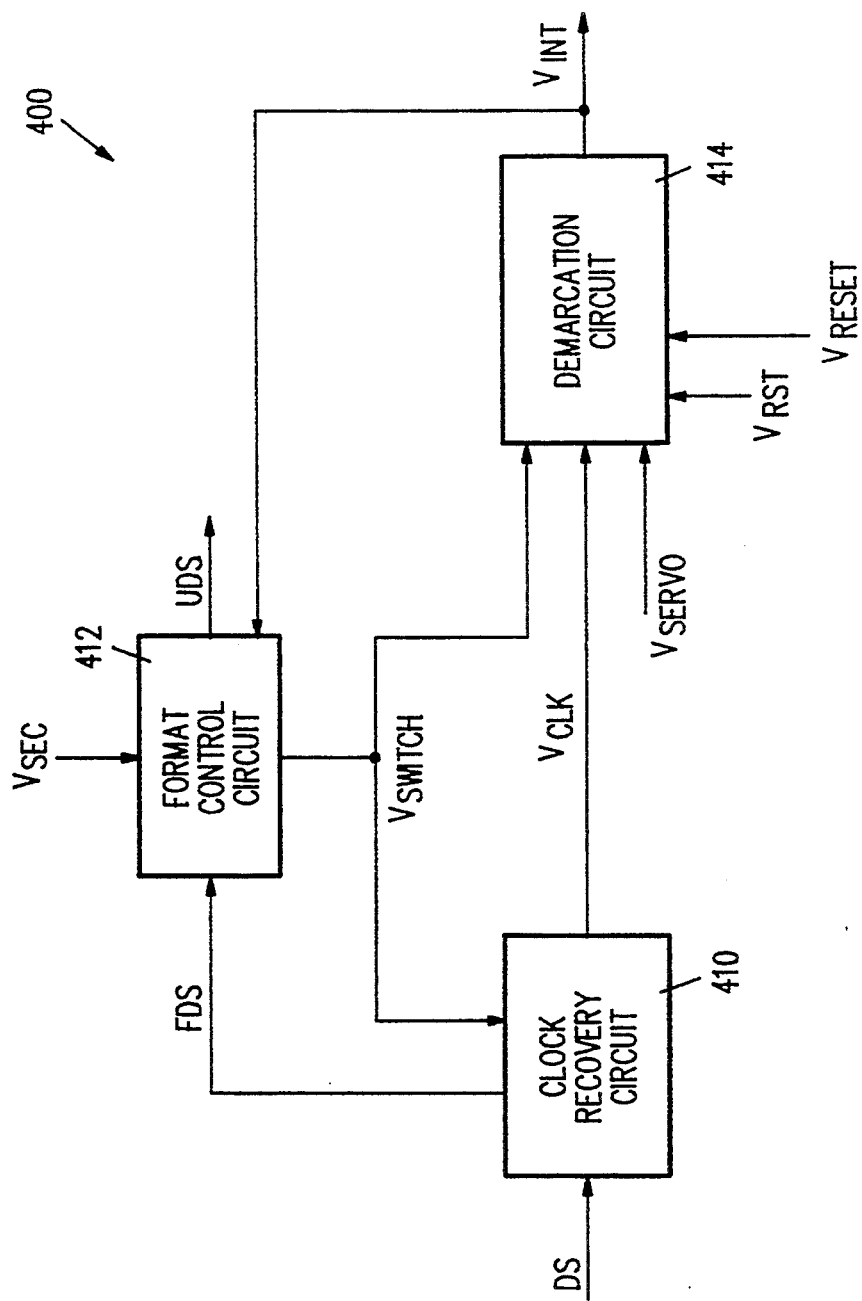
FIG. 8 is a block diagram illustrating a data recovery circuit 400 in accordance with another aspect of the present invention.

FIG. 8 shows a block diagram that illustrates a data recovery circuit 400 in accordance with another aspect of the present invention. As shown in FIG. 8, circuit 400 includes a clock recovery circuit 410 that generates a series of clock signals $V_{CLK}$, and that produces an output formatted data stream FDS by passing an input formatted data stream DS read from the recording disk when a switch signal $V_{SWITCH}$ is asserted. In the preferred embodiment, the clock signals $V_{CLK}$ represent recovered clock signals when the switch signal $V_{SWITCH}$ is asserted and reference clock signals when the switch signal $V_{SWITCH}$ is deasserted.

Data recovery circuit 400 also includes a format control circuit 412 that asserts the switch signal $V_{SWITCH}$ when a sector pulse signal $V_{SEC}$ is detected, that detects the output formatted data stream FDS, and that reads the data stored in the ID field and determines the sector number of the sector that is being read.

Format control circuit 412 also asserts the switch signal $V_{SWITCH}$ at the beginning of the data field, reads the data stored in the data field regardless of whether the sector number that is being read is equal to the sector number which is to be read, ignores the data stored in the data field when the sector number of the sector being read is unequal to the sector number of the sector which is to be read, and generates an unformatted data stream UDS in response to the data stored in the data field when the sector number of the sector being read is equal to the sector number of the sector which is to be read. In addition, circuit 412 also deasserts the switch signal $V_{SWITCH}$ for a predetermined time in response to an interrupt signal $V_{INT}$.

As further shown in FIG. 8, a demarcation circuit 414 counts the clock signals $V_{CLK}$ each time a servo signal $V_{SERVO}$ is detected, and generates the interrupt signal $V_{INT}$ after a predetermined number of clock signals have been detected.

Format control circuit 412 can be formed by modifying the control code instruction set of a conventional format control circuit to include a coast instruction that enables a coast mode, and that disables the coast mode at the end of each sector.

The control code instruction set is also modified so that, while in the coast mode, the instruction that enables data transfers is disabled, the instruction that checks for errors in the data always returns a "no error" status, the instruction that checks for the end of operation always returns a "not end of operation" status, and the instruction that checks for the end of operation is inhibited from incrementing the "sector number" to search for the next sector.

In addition, the user defined program for the format controller is modified to select the coast mode when the sector number of the sector being read is unequal to the sector number of the sector which is to be read, and then to read the data stored in the data field.

Figure 9:
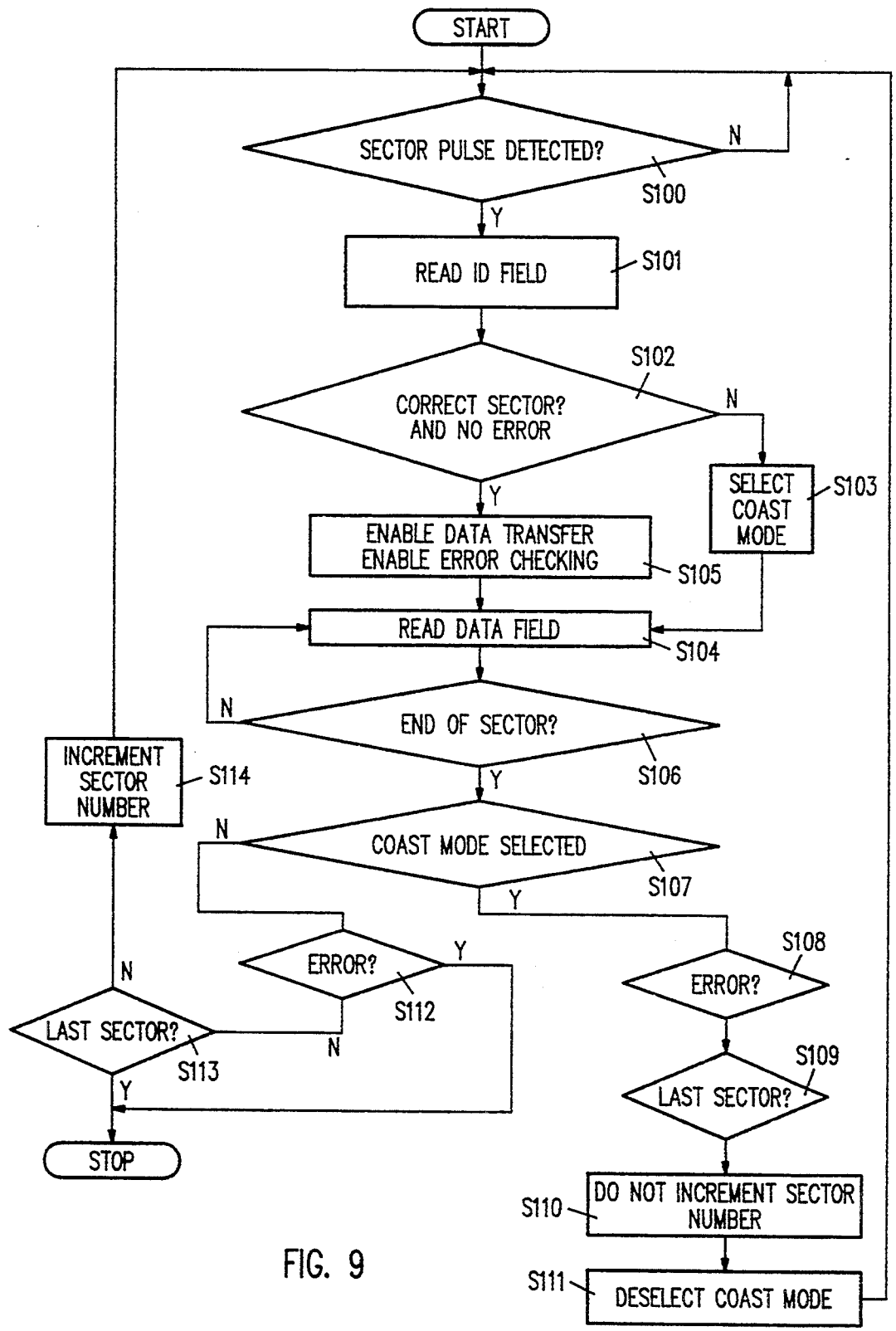
FIG. 9 is a flow diagram illustrating the operation of the format control circuit of the present invention.

For example, FIG. 9 shows a flow diagram that illustrates the operation of the format control circuit of the present invention. As shown in FIG. 9, operation typically begins at step S100 by detecting a sector pulse. After a sector pulse has been detected, operation moves to step S101 where the format control circuit reads the ID field of the sector. At step S102, the format control circuit determines whether that sector is the sector to be read and whether the ID field contains an error. If that sector is not the sector to be read, or if the ID field contains an error, operation moves to step S103 where the coast mode is enabled, and then to step S104 where the data in the data field is read.

If the detected sector is the sector which is to be read, the format control circuit enables the data transfer circuitry and the error checking circuitry in step S105, and then reads the data stored in the data field in step S104. After the end of the sector has been detected in step S106, the format control circuit determines whether the coast mode has been enabled in step S107.

If the coast mode has been enabled, operation moves to step S108 where the format control circuit determines whether an error has occurred. Regardless of whether an error has occurred or not, operation moves to step S109 where the circuit determines whether the last sector has been read. Regardless of whether the last sector has been read or not, operation moves to step S110 where the sector increment number is not incremented. Next, operation moves to step S111 where the coast mode is deselected. Following this, operation returns to step S100 to wait for the next sector pulse.

If the coast mode has not been enabled, operation moves to step S112 where the circuit determines whether an error has occurred. If the data is error free, operation moves to step S113 where the format control circuit determines whether the last sector has been read. If the last sector has not been read, the format control circuit increments the sector number at step S114, and then returns to step 100 to wait for the next sector pulse.

Figure 10:
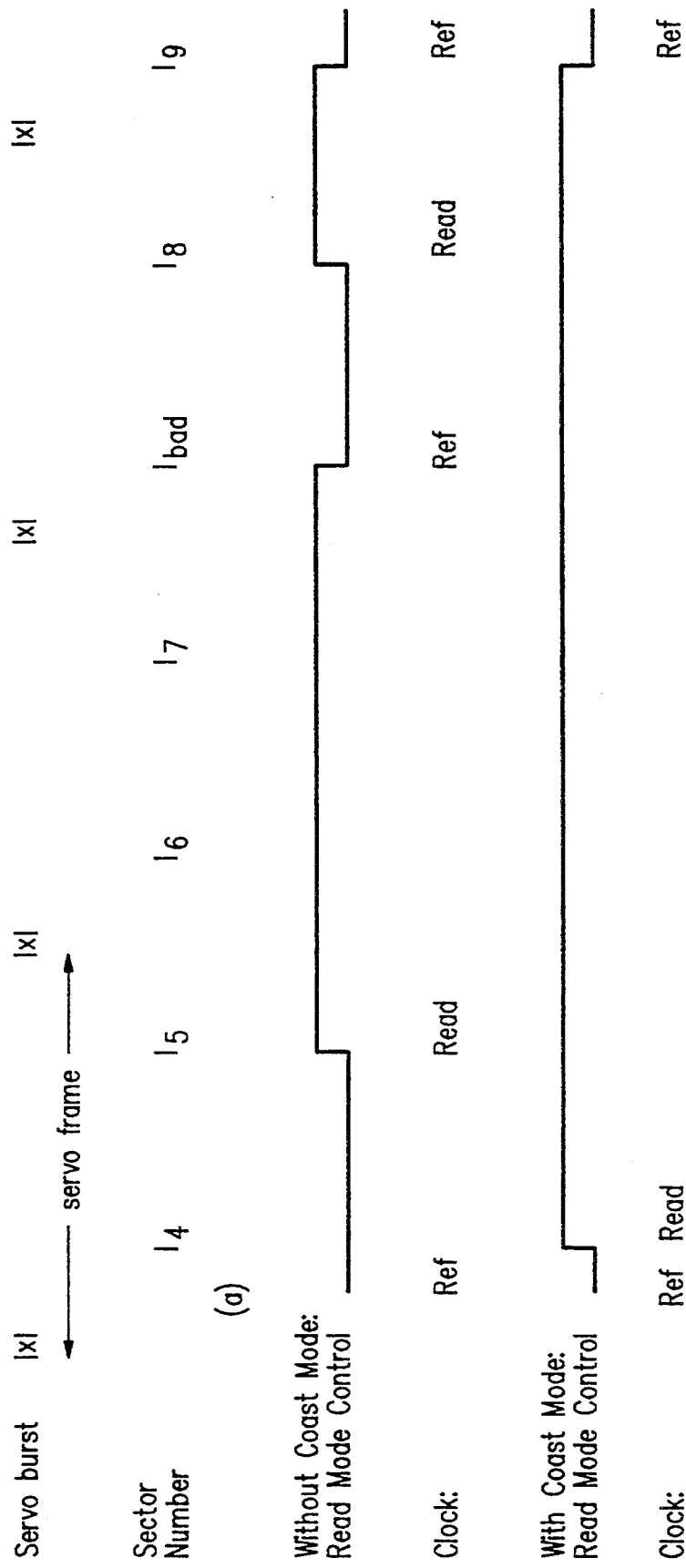
FIG. 10 is a timing diagram illustrating the operation of the format control circuit of the present invention.

FIG. 10 shows a timing diagram that illustrates the operation of the format control circuit of the present invention. Assuming that sectors 5–8 are to be read and ignoring gaps in the sectors, FIG. 10 shows that without the coast mode, the recovered clock signal is only present when the data in sectors 5–8 is being read. On the other hand, with the coast mode, the recovered clock signal is present while all of the sectors are being read, including bad sectors.

Thus, in the present invention, the format control circuit reads all of the data stored in each of the sectors when the coast mode is activated and ignores the data read in from unwanted sectors by, as stated above, disabling the data transfer instruction.

In another aspect of the present invention, the user defined program can also be modified to enable the coast mode while n sectors are read, regardless of which sectors are read, to allow the various timing parameters of the system to settle.

Figure 11A:
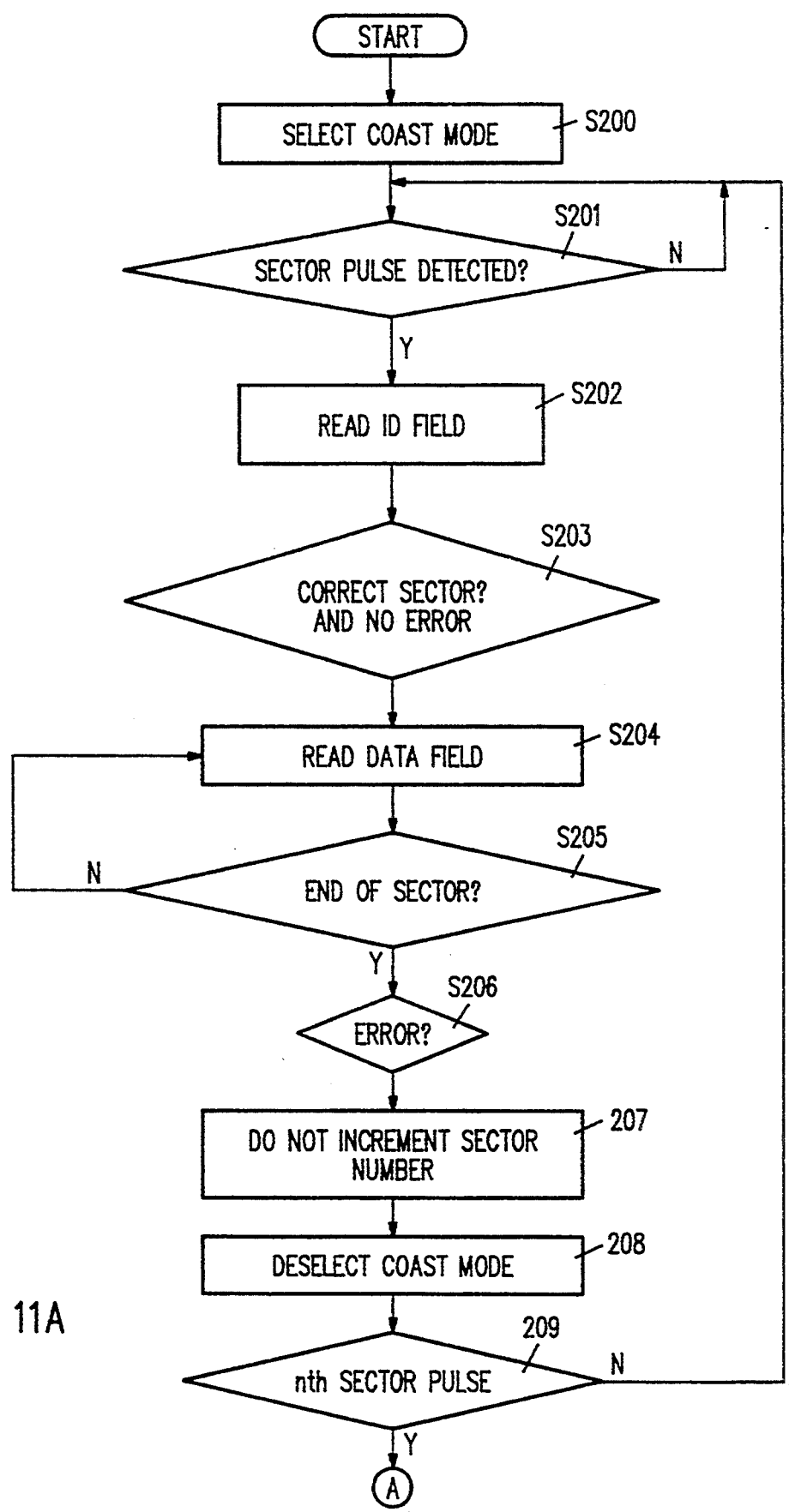
FIGS. 11A and 11B are flow diagrams illustrating the operation of the format control circuit in accordance with this aspect of the present invention.
Figure 11B:
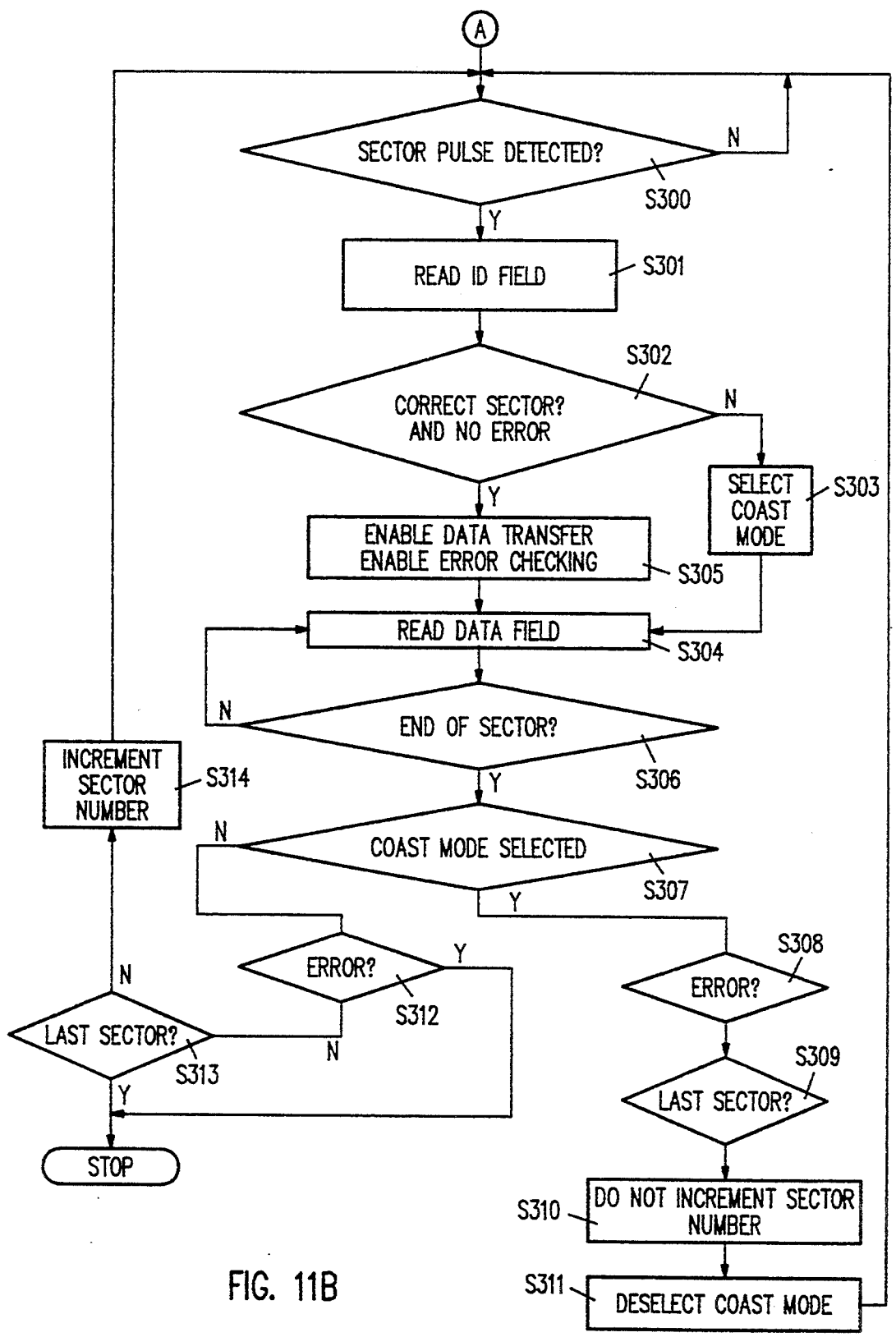

For example, FIGS. 11A and 11B show a flow diagram that illustrates the operation of the format control circuit in accordance with this aspect of the present invention. As shown in FIG. 11, operation typically begins at step S200 by selecting the coast mode. Next, operation moves to step S201 where the format control circuit detects a sector pulse. After a sector pulse has been detected, operation moves to step S202 where the format control circuit reads the ID field of the sector. At step S203, the format control circuit determines whether that sector is the sector to be read and whether the ID field contains an error. Regardless of which sector has been read or if the ID field contains an error, operation moves to step S204 where the data in the data field is read.

After the end of the sector has been detected in step S205, the format control circuit determines whether an error has occurred in step S206. Regardless of whether an error has occurred or not, operation moves to step S207 where the sector increment number is not incremented. Next, the coast mode is deselected in step S208. Following this, the circuit determines whether the nth sector pulse has been detected in step S209. If the nth sector pulse has not been detected, operation returns to step S200.

If the nth sector pulse has been detected, operation moves to step S300. Step S300 through step 314 are as described above with respect to FIG. 9. Although not shown, the operation of the format control circuit illustrated in FIGS. 9, 11A, and 11B checks after each step to determine whether the interrupt signal has been detected.

It should be understood that various alternatives to the embodiments of the invention described herein maybe employed in practicing the invention. It is intended that the following claims define the scope of the invention, that methods and apparatus within the scope of these claims be covered thereby.

What is claimed is:

1. A demarcation circuit for indicating when the last byte of data of a plurality of bytes of data recorded between servo blocks has been read, the circuit comprising:
    a frame counter that counts a plurality of clock signals, resets the count in response to a first start counting signal, and generates a time out signal after a first predetermined number of clock signals have been counted;
    a byte counter that counts the plurality of clock signals, resets the count in response to a second start counting signal, and generates a byte signal each time a second predetermined number of clock signals have been counted;
    a multi-byte counter that counts the byte signals, resets the count in response to the second start counting signal, and generates a multi-byte signal each time a predetermined number of byte signals have been counted; and
    a controller that receives the time out signal and the multi-byte signal, and generates an interrupt signal when the multi-byte signal is asserted after the time out signal has been asserted,
    wherein the plurality of bytes of data recorded between the second start counting signal and a next first start counting signal is a multiple of the predetermined number of byte signals.

2. The circuit of claim 1 wherein the clock signals include reference clock signals and recovered clock signals.

3. The circuit of claim 1 wherein the first start counting signal indicates the presence of a servo block.

4. The circuit of claim 3 wherein the second start counting signal indicates the presence of a data field.

5. The circuit of claim 1 and further comprising a synchronizer that receives a servo signal and the clock signals, and generates the first start counting signal when the clock signal is asserted after the servo signal has been asserted, the servo signal representing the leading edge of a servo block.

6. The circuit of claim 1 and further comprising a count logic circuit that receives the plurality of clock signals and a switch signal, passes each clock signal each time a clock signal is received, and generates an additional clock signal each time the switch signal is received.

7. The circuit of claim 2 wherein the second start counting signal represents a synch marker.

8. The circuit of claim 1 wherein the frame counter counts the clock signals by loading the first predetermined number of clock signals into a clock count register in response to the first start counting signal, and by decrementing the first predetermined number of clock signals in response to each clock signal.

9. The circuit of claim 1 wherein the multi-byte counter counts the byte signals by setting the predetermined number of byte signals in response to a select signal, by incrementing the multi-byte count number in response to each byte signal, by generating the multi-byte signal when the multi-byte count number equals the predetermined number of byte signals, and by resetting the multi-byte count number each time the multi-byte signal is generated.

10. The circuit of claim 6 and further comprising a synchronizer that receives the clock signals and a servo signal, and generates the first start counting signal when the clock signal is asserted after the servo signal has been asserted, the servo signal representing the leading edge of a servo block.

11. A demarcation circuit for indicating when the last byte of data of a plurality of bytes of data recorded between servo blocks has been read, the circuit comprising:
    a synchronizer that receives a plurality of clock signals and a servo signal, and generates a synch signal each time a clock signal is asserted after the servo signal has been asserted;
    a count logic circuit that receives a switch signal and the clock signals, generates a decrement signal each time a clock signal is received, and generates the decrement signal each time the switch signal is received;
    a learning circuit that generates a load signal in response to each synch signal when both a learning signal and a store signal are set to a first logic state, that generates the learning signal with a second logic state in response to the first synch signal that occurs after the logic state of an externally-generated control signal is set to a first logic state, that changes the logic state of the learning signal to the first logic state, and that generates the store signal with a second logic state in response to the second synch signal that occurs after the logic state of the control signal is set to the first logic state;
    a frame counter that loads a clock count number in response to the load signal, that decrements the clock count number in response to each decrement signal, that generates a time out signal after a predetermined number of decrement signals have been counted, that resets the clock count number when the logic state of the learning signal is set to the second logic state, that increments the clock count number in response to each decrement signal when the logic state of the learning signal is set to the second logic state, and that stores the incremented clock count number when the logic state of the store signal is set to the second logic state;

a byte counter that counts the plurality of clock signals, resets the count in response to a start counting signal, and generates a byte signal each time a second predetermined number of clock signals have been counted;

a multi-byte counter that counts the byte signals, resets the count in response to the start counting signal, and generates a multi-byte signal each time a predetermined number of byte signals have been counted; and a controller that generates an interrupt signal when the multi-byte signal is asserted after the time out signal has been asserted.

12. A method for indicating when the last byte of data of a plurality of bytes of data recorded between servo blocks has been read, the method comprising the steps of:

counting a plurality of clock signals after the beginning of a servo block;

generating a time out signal after a first predetermined number of clock signals have been counted;

counting the plurality of clock signals after the beginning of a data marker;

generating a byte signal each time a second predetermined number of clock signals have been counted;

generating a multi-byte signal each time a predetermined number of byte signals have been counted; and generating an interrupt signal when the multi-byte signal is asserted after the time out signal has been asserted, wherein the plurality of bytes of data recorded between the data marker and a next servo block is a multiple of the predetermined number of byte signals.

13. The method of claim 12 and further comprising the step of:

generating a clock signal each time an externally-generated switch signal is received.

14. A method for indicating when the last byte of data of a plurality of bytes of data recorded between servo blocks has been read, the method comprising the steps of:

receiving a plurality of clock signals, a servo signal, and a switch signals;

generating a synch signal that indicates the beginning of a servo block each time a clock signal is asserted after the servo signal has been asserted;

generating a decrement signal each time a clock signal is received;

generating the decrement Signal each time the switch signal is received;

generating a load signal in response to each synch signal when both a learning signal and a store signal are set to a first logic state;

generating the learning signal with a second logic state in response to the first synch signal that occurs after the logic state of an externally-generated control signal is set to a first logic state;

changing the logic state of the learning signal to the first logic state, and generating the store signal with a second logic state in response to the second synch signal that occurs after the logic state of the control signal is set to the first logic state;

loading a clock count number in response to the load signal;

decrementing the clock count number in response to each decrement signal;

generating a time out signal after a predetermined number of decrement signals have been counted;

resetting the clock count number when the logic state of the learning signal is set to the second logic state;

incrementing the clock count number in response to each decrement signal when the logic state of the learning signal is set to the second logic state;

storing the incremented clock count number when the logic state of the store signal is set to the second logic state;

generating a byte signal each time a predetermined number of clock signals have been counted following a start counting signal;

generating a multi-byte signal each time a predetermined number of byte signals have been counted; and generating an interrupt signal when both the time out signal and the multi-byte signal are present at the same time.

15. A data recovery circuit for reading data stored in a plurality of sectors formed on a recording disk, each sector having an identification (ID) field and a data field, the apparatus comprising:

a clock recovery circuit that generates a plurality of clock signals, and that produces an output formatted data stream by passing an input formatted data stream read from the recording disk when a switch signal is asserted, the plurality of clock signals representing a recovered clock signal when the switch signal is asserted and representing a reference clock signal when the switch signal is deasserted;

a format control circuit that asserts the switch signal when a sector pulse signal is detected, that detects the formatted data stream, that reads the data stored in the ID field and determines a current sector number, that asserts the switch signal at the beginning of the data field and reads the data stored in data field regardless of whether the current sector number is equal to a search sector number, that ignores the data stored in the data field when the current sector number is unequal to the search sector number, that generates a stream of unformatted data in response to the data stored in the data field when the current sector number is equal to the search sector number, and that deasserts the switch signal for a predetermined time when an interrupt signal is asserted;

a demarcation circuit that receives the plurality of clock signals and the switch Signal, and indicates when the last byte of data of a plurality of bytes of data recorded between servo blocks has been read.

16. The circuit claim 15 wherein the demarcation circuit comprises:

a count logic circuit that generates a decrement signal each time one of the clock signals is received, and generates the decrement signal each time the switch signal is received;

a frame counter that counts the decrement signal after the beginning of a servo block, and generates a time out signal after a predetermined number of decrement signals have been counted;

a byte counter that counts the clock signals, resets the count in response to a start counting signal, and generates a byte signal each time a predetermined number of clock signals have been counted;

a multi-byte counter that counts the byte signals, resets the count in response to the start counting signal, and generates a multi-byte signal each time a predetermined number of byte signals have been counted; and a controller that generates the interrupt signal when the multi-byte signal is asserted after the time out signal has been asserted.

17. A method for reading data stored in a plurality of sectors formed on a recording disk, each sector having an identification (ID) field and a data field, the method comprising the steps of:

detecting a sector pulse;

reading the data stored in the ID field when the sector pulse is detected;

determining a current sector number from the ID field;

determining whether the current sector number is equivalent to a search sector number;

disabling data transfer and error checking when the current sector number is unequal to the search sector number or when the ID field is in error;

enabling data transfer and error checking when the current sector number is equal to the search sector number;

reading the data stored in the data field regardless of whether the data transfer and error checking is disabled or enabled;

determining the end of the sector;

determining whether the data transfer and error checking have been enabled;

determining whether a last sector has been read when the data transfer and error checking have been enabled; and incrementing the search sector number when the last sector has not been read.

18. The method of claim 17 and further comprising:

disabling data transfer and error checking;

detecting a sector pulse after data transfer and error checking have been disabled;

reading the data stored in the ID field when the sector pulse is detected;

reading data stored in the data field after the data stored in the ID field is read;

determining the end of the sector;

enabling data transfer and error checking when the end of the sector is determined; and determining whether an nth pulse has been detected.

19. A demarcation circuit for indicating when the last byte of data of a plurality of bytes of data recorded between servo blocks has been read, the circuit comprising:

a frame counter that counts a plurality of clock signals, resets the count in response to a first start counting signal, and asserts a time out signal after a first predetermined number of clock signals have been counted;

a byte counter that counts the plurality of clock signals, resets the count in response to a second start counting signal, and asserts a byte signal each time a second predetermined number of clock signals have been counted;

a multi-byte counter that counts the byte signals, resets the count in response to the second start counting signal, and asserts a multi-byte signal each time a predetermined number of byte signals have been counted; and a controller that receives the time out signal and the multi-byte signal, and asserts an interrupt signal when the multi-byte signal and the time out signal are asserted at the same time, wherein the plurality of bytes of data recorded between the second start counting signal and a next first start counting signal is a multiple of the predetermined number of byte signals.

20. The circuit of claim 19 wherein the first start counting signal indicates the presence of a servo block and the second start counting signal indicates the presence of a data field.

* * * * *